United States Patent
Schaap et al.

(10) Patent No.: US 7,979,767 B2
(45) Date of Patent: Jul. 12, 2011

(54) AUTOMATIC REPEAT REQUEST (ARQ) RESET METHOD

(75) Inventors: Wim Schaap, Noord Holland (NL); Gerrit W. Hiddink, Utrecht (NL); Marcel Korndewal, Utrecht (NL); Leon J. Zegers, Noord-Holland (NL)

(73) Assignee: Motorola Mobility, Inc., Libertyville, IL (US)

( * ) Notice: Subject to any disclaimer, the term of this patent is extended or adjusted under 35 U.S.C. 154(b) by 1189 days.

(21) Appl. No.: 11/673,189

(22) Filed: Feb. 9, 2007

(65) Prior Publication Data

US 2008/0195911 A1    Aug. 14, 2008

(51) Int. Cl.
H04L 1/18 (2006.01)
G08C 25/00 (2006.01)
(52) U.S. Cl. ........................................ 714/748; 714/749
(58) Field of Classification Search ........... 714/748–751
See application file for complete search history.

(56) References Cited

U.S. PATENT DOCUMENTS

| | | |
|---|---|---|
| 2003/0206534 A1 | 11/2003 | Wu |
| 2006/0156165 A1* | 7/2006 | Kim ............................. 714/749 |
| 2007/0110101 A1 | 5/2007 | Wu |

FOREIGN PATENT DOCUMENTS

| | | |
|---|---|---|
| WO | 20050109778 A | 11/2005 |
| WO | 2006065008 A1 | 6/2006 |

OTHER PUBLICATIONS

"Part 16: Air Interface for Fixed Broadband Wireless Access Systems", IEEE Standard for Local and Metropolitan Area Networks, IEEE STD 802.16/2004 (Revision of IEEE STD 802.16/2001), Oct. 1, 2004, Section 6.3.4.2.
"Part 16: Air Interface for Fixed and Mobile Broadband Wireless Access Systems, Amendment 2: Physical and Medium Access Control Layers for Combined Fixed and Mobile Operation in Licensed Bands and Corrigendum 1", IEEE Standard for Local and Metropolitan Area Networks, IEEE STD 802.16e-2005 and IEEE STD 802.16/2004/Cor1-2005 (Amendment and corrigendum to IEEE STD 802.16/2004), Section 6.3.4.2.
Universal Mobile Telecommunications System (UMTS), Radio Link Control (RLC) Protocol Specification 3GPP TS 25.322 version 7.2.0, Sep. 1, 2006, Sophia Antipolis, Cedex, France.

(Continued)

Primary Examiner — Guy J Lamarre
(74) Attorney, Agent, or Firm — Sylvia Chen

(57) ABSTRACT

An Automatic Repeat-reQuest (ARQ) Reset method for an ARQ transmitter disables (120) transmission, starts (130) an ARQ transmitter window at a first unacknowledged block, and discards (140) service data units (SDUs) in the ARQ transmitter window having zero blocks in a 'not-sent' state. Thus, for all SDUs having no blocks in a 'not-sent' state, the blocks in an 'outstanding' or 'waiting-for-retransmission' state are changed to a 'discard' state. Next, the ARQ transmitter sets (150) the state of all blocks in partially unsent SDUs of the ARQ transmitter window to 'not-sent.' So, any remaining blocks in an 'outstanding,' 'waiting-for-transmission' or 'discard' state are changed to 'not-sent.' After the ARQ transmitter enables (160) transmission and ends (190) the ARQ Reset procedure, the ARQ transmitter will send blocks in the 'not-sent' state. This ARQ Reset method avoids retransmitting blocks that might cause duplicate packets at the ARQ receiver, which some protocols cannot handle.

4 Claims, 3 Drawing Sheets

OTHER PUBLICATIONS

Institute of Electrical and Electronics Engineers (IEEE), Air Interface for Fixed Broadband Wireless Access Systems, IEEE Standard for Local and Metropolitan Area Networks 802.16/2004, Part 16, 2004, pp. 128-138.

Institute of Electrical and Electronics Engineers (IEEE), Air Interface for Fixed Broadband Wireless Access Systems—Amendment 2: Medium Access Control Modifications and Additional Physical Layer Specifications 2-11 GHz, IEEE Standard 802.16A-2003, Part 16, Nov. 1, 2007.

* cited by examiner

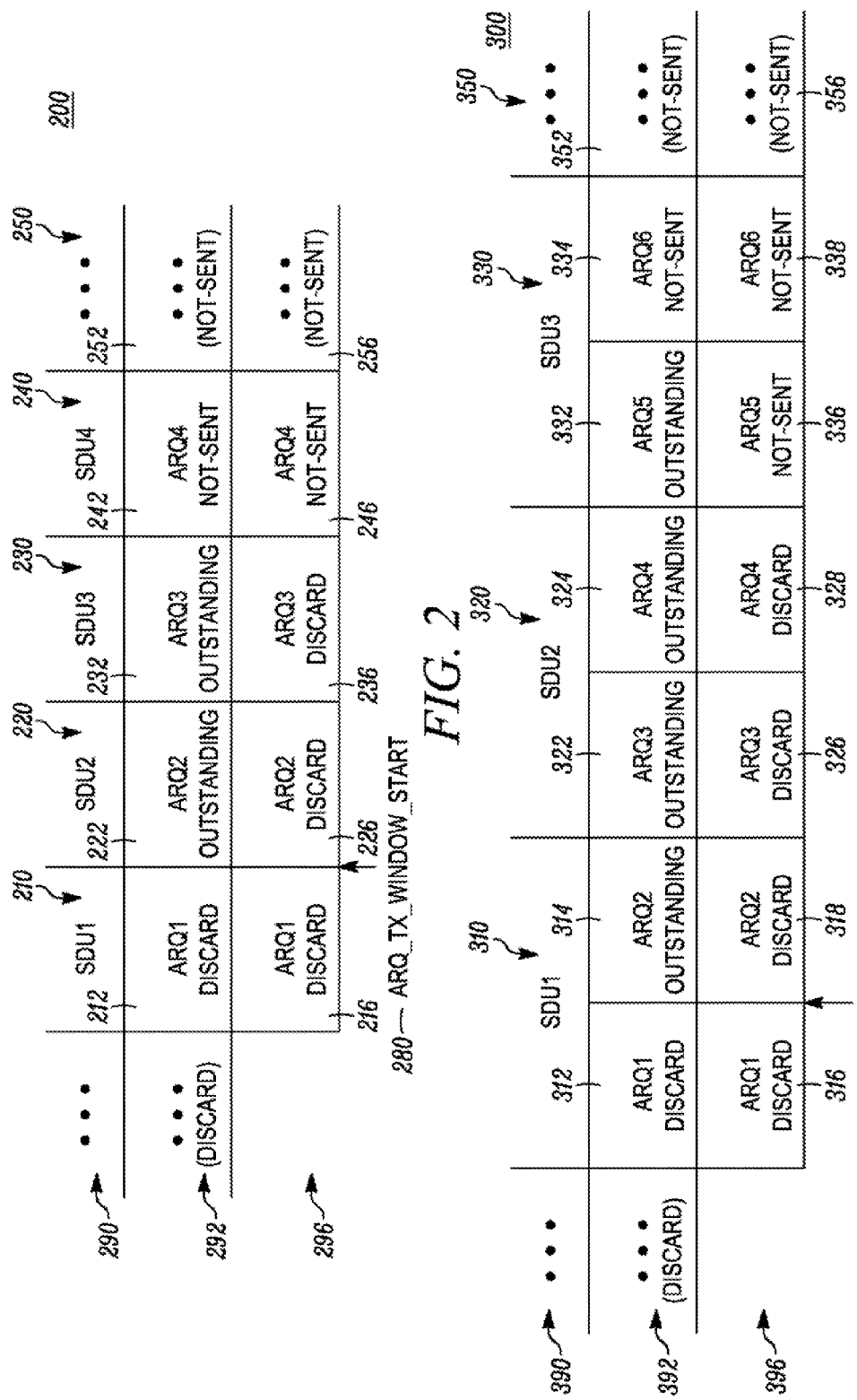

AUTOMATIC REPEAT REQUEST (ARQ) RESET METHOD

FIELD OF THE DISCLOSURE

This disclosure relates generally to Automatic Repeat-reQuest (ARQ)-enabled transmitters.

BACKGROUND OF THE DISCLOSURE

According to Section 6.3.4.6.2 of IEEE Standard 802.16e (Institute for Electrical and Electronics Engineers Standard for Local and Metropolitan Area Networks, Part 16: Air Interface for Fixed Broadband Wireless Access Systems, including Amendment 2 and Corrigendum 1), during an ARQ Reset procedure, all service data units (SDUs) with ARQ blocks in a 'discarded' state are to be discarded by an ARQ transmitter and all other ARQ blocks retransmitted after the ARQ Reset procedure has completed.

From an ARQ transmitter's point of view, an ARQ block may be in one of the following four states: not-sent, outstanding, discarded, and waiting-for-retransmission. Any ARQ block begins in the ARQ transmitter as 'not-sent.' After it is sent by the ARQ transmitter, the ARQ block becomes 'outstanding' for a "retry-timeout" period of time. While a block is in the 'outstanding' state, it is either acknowledged (an ACK is received from the ARQ receiver) and 'discarded', or the block transitions to 'waiting-for-retransmission' after the retry-timeout expires or a NACK is received from the ARQ receiver. An ARQ block can transition from 'waiting-for-retransmission' to 'discarded' when an ACK message for it is received or after a "lifetime-timeout" period has expired.

If an ARQ transmitter and its ARQ receiver lose synchronization, either the ARQ transmitter or the ARQ receiver can initiate an ARQ Reset procedure to restore synchronization. According to FIG. 34 and FIG. 35 of IEEE Standard 802.16e, an ARQ transmitter discards SDUs with one or more blocks in the 'discarded' state during the ARQ Reset procedure. Then, SDUs that have no ARQ blocks in the discard state will be sent (or resent).

One consequence of this behavior is that ARQ blocks that were received by the ARQ receiver before the ARQ Reset procedure initiated may be resent after the ARQ Reset procedure is complete. In fact, ARQ blocks for a complete SDU may be resent in accordance with this procedure even when the complete SDU was already received by the ARQ receiver before the ARQ Reset procedure started. For example, all the ARQ blocks for an SDU can be in the 'outstanding' state because ACKs sent by the ARQ receiver were not received by the ARQ transmitter. Then, these 'outstanding' ARQ blocks will transition to 'waiting-for-retransmission' and be resent after the ARQ Reset procedure has completed. In this case, the ARQ receiver will assemble a duplicate SDU and pass it to the higher layer. Thus, the higher layer receives duplicate packets.

Some higher layer transport protocols, such as Transmission Control Protocol (TCP) and Real-time Transport Control Protocol (RTCP), use sequence numbers and will be able to detect and discard these duplicate packets. Other protocols, however, cannot easily detect and discard duplicate packets. For example, Robust Header Compression (ROHC) specifically requires that lower layers not generate duplicate packets.

Thus, there is an opportunity to prevent duplicate packets resulting from an ARQ Reset procedure. The various aspects, features and advantages of the disclosure will become more fully apparent to those having ordinary skill in the art upon careful consideration of the following Drawings and accompanying Detailed Description.

BRIEF DESCRIPTION OF THE DRAWINGS

FIG. 2 shows a sample ARQ window with one ARQ block per SDU both before and after an ARQ Reset procedure performed in accordance with FIG. 1.

FIG. 3 shows a sample ARQ window with two ARQ blocks per SDU both before and after an ARQ Reset procedure performed in accordance with FIG. 1.

DETAILED DESCRIPTION

The Automatic Repeat-reQuest (ARQ) Reset method for an ARQ transmitter discards all service data units (SDUs) after the start of an ARQ transmitter window that have no blocks in the 'not-sent' state and changes the state of all blocks in partially unsent SDUs to 'not-sent'. When the ARQ Reset procedure is completed, the ARQ transmitter will send (or resend) all the blocks in the 'not-sent' state. By discarding SDUs having all their ARQ blocks in the 'discard,' 'outstanding,' and 'waiting-for-retransmission' states, the ARQ Reset method avoids retransmitting ARQ blocks that might result in duplicate packets at the ARQ receiver. This is important because some transport layer protocols cannot handle duplicate packets or experience poor efficiency when dealing with duplicate packets, while most transport layer protocols can handle lost packets.

Figure 1:
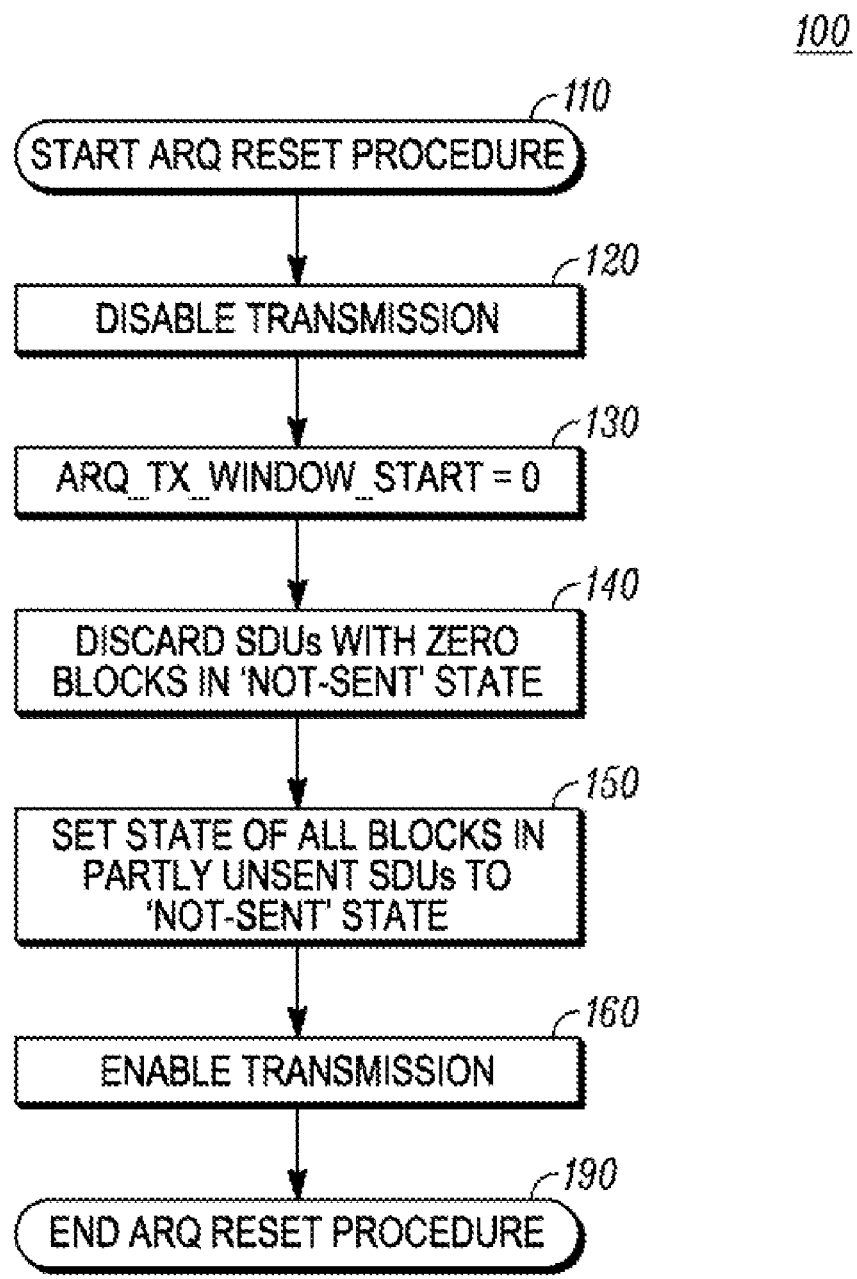
FIG. 1 shows a flow chart of an ARQ Reset method for an ARQ transmitter.

FIG. 1 shows a flow chart 100 of an ARQ Reset method for an ARQ transmitter. In step 110, the ARQ Reset procedure starts. An ARQ Reset procedure can be initiated by either an ARQ transmitter or an ARQ receiver when it notices that it is out of synchronization with its counterpart. If an ARQ transmitter initiates the ARQ Reset procedure, it notifies its counterpart ARQ receiver. If an ARQ receiver initiates the ARQ Reset procedure, it notifies its counterpart ARQ transmitter. Either way, after the ARQ Reset procedure starts, the ARQ transmitter disables transmission in step 120. Step 130 sets the ARQ_TX_WINDOW_START to zero in step 130. This means that the ARQ transmitter notes the location of the first unacknowledged ARQ block and the ARQ transmitter window starts at that point. An acknowledged ARQ block is in the 'discard' state, so an unacknowledged ARQ block is in a 'outstanding,' 'waiting-for-retransmission,' or 'not-sent' state.

In step 140, the ARQ transmitter considers partial and complete SDUs occurring after the start of the ARQ transmitter window. An SDU is a data unit received from an adjacent higher layer. An SDU, sometimes called a 'packet' in this context, is reformatted into one or more blocks for ARQ transmission. If an SDU has associated no blocks in the 'not-sent' state, then the SDU is discarded. In other words, if all the ARQ blocks relating to an SDU are in either the 'discard,' 'outstanding,' or 'waiting-for-retransmission' state, then the ARQ transmitter changes all the ARQ blocks for that SDU to the 'discard' state.

In step 150, the ARQ Reset method considers the remaining SDUs after the start of the ARQ transmitter window. For any SDUs having associated ARQ blocks in both a 'not-sent' state and another state (i.e., 'discard,' 'outstanding,' or 'waiting-for-retransmission'), the blocks in the other state are changed to the 'not-sent' state. This allows complete SDUs to be transmitted after the ARQ Reset procedure finishes. Because an ARQ receiver discards all incomplete SDUs during an ARQ Reset procedure, step 150 does not result in duplicate packets at the ARQ receiver.

Step 160 enables transmission, and step 190 indicates the end of the ARQ Reset procedure. When the ARQ Reset procedure is completed, the ARQ transmitter sends 'not-sent' blocks with new sequence numbers and the ARQ receiver receives these blocks, provides ACKs or NACKs, constructs SDUs, and sends them to the higher layers according to general ARQ reception methods. Note that there is no change to the ARQ receiver and it continues to operate in accordance with FIG. 34 and FIG. 35 of IEEE Standard 802.16e.

In order to better understand the effect of the ARQ Reset method shown in FIG. 1, FIGS. 2-4 provide examples with regard to various transmission streams.

FIG. 2 shows a sample ARQ window 200 with one ARQ block associated with one SDU both before and after an ARQ Reset procedure performed in accordance with FIG. 1. The number of blocks associated with any particular SDU is variable, and there is shown a consistent one block per SDU in this example only for the sake of simplicity. Row 290 illustrates the concept of higher layer protocol SDUs and shows four SDUs 210, 220, 230, 240 and allows for further SDUs 250 as well as prior SDUs. Row 292 shows current layer protocol ARQ blocks 212, 222, 232, 242, 252 along with the states of the associated ARQ blocks immediately before initiating an ARQ Reset procedure. Row 296 shows current layer protocol ARQ blocks 216, 226, 236, 246, 256 along with the states of the ARQ blocks at the completion of the ARQ Reset method shown in FIG. 1. Note that the ARQ blocks 222, 232 that were in the 'outstanding' state prior to the ARQ Reset procedure are in the 'discard' state at the conclusion of the ARQ Reset method. By changing the ARQ blocks 222, 232 from the 'outstanding' state to the 'discard' state as shown by ARQ blocks 226, 236, the ARQ Reset method of FIG. 1 avoids retransmitting the complete SDUs 220, 230 after the ARQ Reset procedure is complete. By avoid the retransmission of complete SDUs 220, 230, which would result from complying with Section 6.3.4.6.2 of IEEE Standard 802.16e, the ARQ Reset method of FIG. 1 avoids stressing the higher layer with duplicate packets.

During the ARQ Reset method of FIG. 1, the start of the ARQ transmitter window 280 is set at the earliest ARQ block where no acknowledgement has been received from the ARQ receiver. See step 130 in FIG. 1. Thus, the ARQ transmitter window starts at the beginning of ARQ block 222, which is in the 'outstanding' state immediately prior to the ARQ Reset procedure. Because the ARQ transmitter window will start at the earliest block that is not in the 'discard' state, in a different situation it could have started at an earliest 'waiting-for-retransmission' or 'not-sent' ARQ block.

All the SDUs having no associated ARQ blocks in the 'not-sent' state are changed to the 'discard' state. See step 140 in FIG. 1. Because in this example each ARQ block is associated with a unique SDU, the SDUs 220, 230 with associated ARQ blocks 222, 232 only in an 'outstanding' state after the start of the ARQ transmitter window 280 are changed to the 'discard' state. See ARQ blocks 226, 236. Thus, the SDUs 220, 230 are discarded. The effect of step 140 in FIG. 1 is that SDUs having all their ARQ blocks in the 'discard,' 'outstanding,' or 'waiting-for-retransmission' states will be discarded.

Next, all the SDUs with at least one ARQ block in the 'not-sent' state will have all their associated ARQ blocks set to the 'not-sent' state. See step 150 of FIG. 1. Because in this example each SDU is represented by only one ARQ block, there is no further change to the state of the ARQ blocks during the ARQ Reset method and 'not-sent' ARQ blocks 242, 252 remain in their 'not-sent' states as ARQ blocks 246, 256 when the ARQ Reset method ends.

When the ARQ Reset procedure is complete, the ARQ transmitter will send all the ARQ blocks 246, 256 in row 296 that are in the 'not-sent' state and will process ACKs, NACKs, and timeouts in accordance with the general ARQ process. Although the 'outstanding' ARQ blocks 222, 232 were not acknowledged and also were not re-sent after the ARQ Reset procedure, there is a chance that the ARQ receiver did receive those ARQ blocks 222, 232 and was able to reassemble SDUs for delivery to the higher layer. If one or more of these 'outstanding' ARQ blocks 222, 232 was not received by the ARQ receiver, the high layer protocol of the ARQ receiver has methods to handle these lost packets.

FIG. 3 shows a sample ARQ window 300 with two ARQ blocks per SDU both before and after an ARQ Reset procedure performed in accordance with FIG. 1. Although each of the three SDUs 310, 320, 330 shown has two blocks for the sake of simplicity, SDUs can have differing numbers of blocks. For SDUs having more than one associated ARQ block, step 140 and step 150 of FIG. 1 have a slightly more complicated effect. Similar to FIG. 2, row 390 illustrates high layer protocol SDUs 310, 320, 330 and allows for further SDUs 350. Row 392 shows current layer protocol ARQ blocks 312, 314, 322, 324, 332, 334, 352 along with the states of the ARQ blocks before an ARQ Reset procedure has initiated. Row 396 shows current layer protocol ARQ blocks 316, 318, 326, 328, 336, 338, 356 along with the states of the ARQ blocks at the completion of the ARQ Reset method shown in FIG. 1.

In this example, several ARQ blocks 314, 322, 324 in an 'outstanding' state were changed to the 'discard' state by the ARQ Reset method of FIG. 1 while another ARQ block 332 in an 'outstanding' state was changed to the 'not-sent' state. This is because of the relationship of each 'outstanding' ARQ block to other blocks of the same SDU. This differs from compliance with Section 6.3.4.6.2 of IEEE Standard 802.16e, which would have resent ARQ blocks 326, 328 (as well as resent ARQ block 336) and might have resulted in a duplicate packet corresponding to SDU2 320.

The start of the ARQ transmitter window 380 begins where the first non-'discard' ARQ block begins. See step 130 of FIG. 1. In this example, the ARQ transmitter window 380 starts at the beginning of the first 'outstanding' ARQ block 314. Next, the ARQ Reset method inspects SDUs and discards all SDUs with zero blocks in the 'not-sent' state. See step 140 of FIG. 1. In this example, SDU1 310 has no associated blocks in the 'not-sent' state, so each of the ARQ blocks relating to SDU1 310 are changed to the 'discard' state as shown by ARQ blocks 316, 318. Also, SDU2 320 also has no associated blocks in the 'not-sent' state. So 'outstanding' ARQ blocks 322, 324 are changed to the 'discard' state as shown by ARQ blocks 326, 328. There are no further SDUs with zero blocks in a 'not-sent' state.

Next, the ARQ Reset method sets the state of all ARQ blocks in partially unsent SDUs to 'not-sent'. See step 150 of FIG. 1. In this example SDU3 330 has an associated ARQ block 334 in the 'not-sent' state, which means it is a partially unsent SDU. The ARQ transmitter then changes any other ARQ blocks associated with SDU3 330 to the 'not-sent' state. In this case, ARQ5 block 332 changes from the 'outstanding' state to the 'not-sent' state as shown by ARQ5 block 336. Further wholly not-sent SDUs 350 remain in the 'not-sent' state.

When the ARQ Reset method is complete, the ARQ transmitter sends all the ARQ blocks 336, 338, 356 in row 396 that are in the 'not-sent' state and will process ACKs, NACKs, and timeouts in accordance with the general ARQ process. Although the 'outstanding' ARQ blocks 314, 322, 324 were not acknowledged and also not resent after the ARQ Reset procedure, it is possible that the ARQ2 block 314 was received by the ARQ receiver, processed with the acknowledged ARQ1 block 312 into a complete SDU and delivered to the ARQ receiver's higher layer. Even if the ARQ2 block 314 was never received, the ARQ receiver's higher layer can handle the missing packet related to SDU1 310. Additionally, it is also possible that both of the ARQ blocks 322, 324 for SDU2 320 were received by the ARQ receiver before the ARQ Reset procedure started, and thus the corresponding SDU was assembled and delivered to the ARQ receiver's higher layer. Again, even if SDU2 320 was not reconstructed at the ARQ receiver, transport layer protocols can generally handle missing packets.

On the other hand, the final 'outstanding' ARQ block 332 was retransmitted because the ARQ receiver is directed to discard all incomplete SDUs during an ARQ Reset procedure. See FIG. 34 and FIG. 35 of IEEE Standard 802.16e. Thus, resending the ARQ5 block 336 along with previously unsent ARQ6 block 338 does not result in a duplicate packet at the ARQ receiver.

Figure 4:
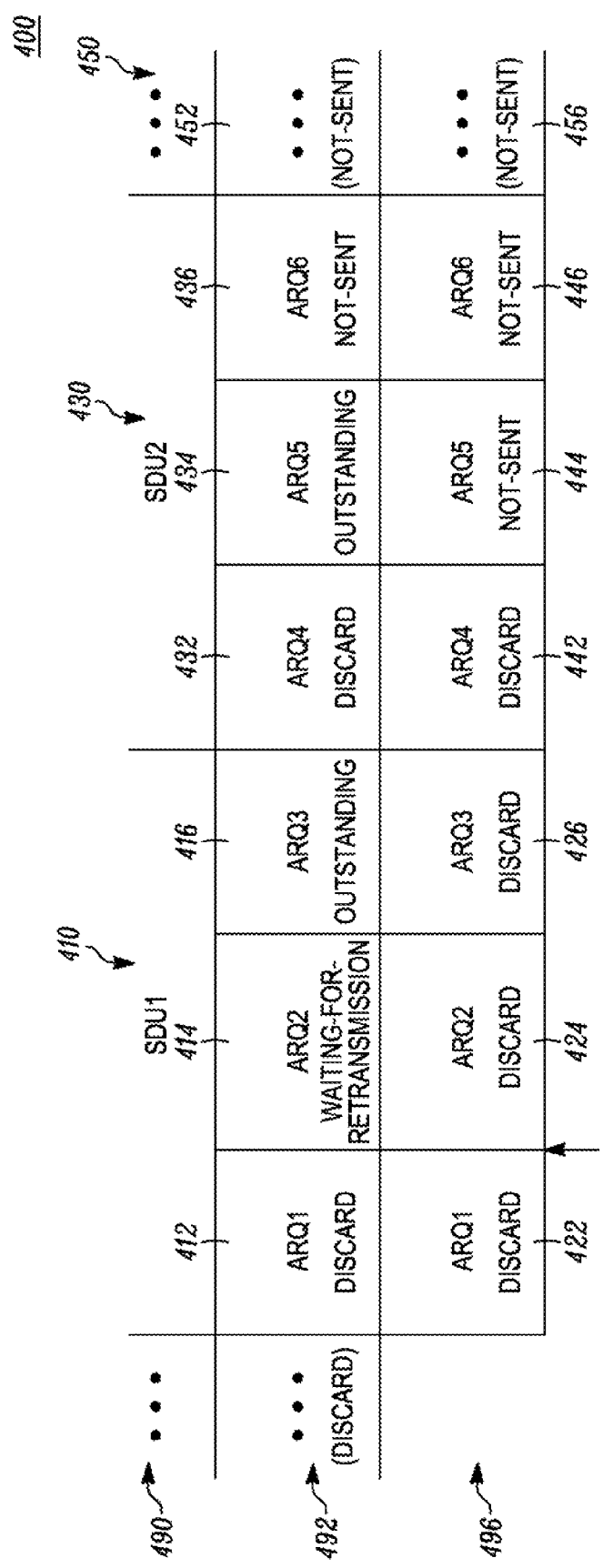
FIG. 4 shows a sample ARQ window with three ARQ blocks per SDU both before and after an ARQ Reset procedure performed in accordance with FIG. 1.

FIG. 4 shows a sample ARQ window 400 with three ARQ blocks per SDU both before and after an ARQ Reset procedure performed in accordance with FIG. 1. Row 490 refers to higher layer protocol SDUs 410, 430 and further SDUs 450. Note that although SDU1 410 and SDU2 430 each have three blocks in this example, further SDUs 450 may have a different number of blocks. Row 492 shows the states of the current layer protocol ARQ blocks 412, 414, 416, 432, 434, 436 and further ARQ blocks 452 prior to an initiation of an ARQ Reset procedure. Row 496 shows ARQ blocks 422, 424, 426, 442, 444, 446 and further ARQ blocks 456 and their states after the ARQ Reset method of FIG. 1 has completed.

In this example, the 'waiting-for-retransmission' state ARQ block 414 and the 'outstanding' state ARQ block 416 were both changed to a 'discard' state by the ARQ Reset method of FIG. 1 because SDU1 410 had no blocks in the 'not-sent' state. The 'discard' state ARQ block 432 and the 'outstanding' state ARQ block 434 were both changed to a 'not-sent' state by the ARQ Resent method of FIG. 1 because SDU2 430 had an ARQ block 436 in the 'not-sent' state. This is different from the behavior specified in Section 6.3.4.6.2 of IEEE Standard 802.16e, which would have discarded not only ARQ blocks 424, 426 but also ARQ blocks 444, 446. Because an ARQ receiver discards all incomplete SDUs during an ARQ Reset procedure, discarding ARQ blocks 444, 446 in accordance with Section 6.3.4.6.2 of IEEE Standard 802.16e would have guaranteed a missing packet relating to SDU2 430. On the other hand, changing all of the blocks relating to SDU2 430 to a 'not-sent' state in accordance with FIG. 1 allows the full packet to be received without any chance of it being a duplicate.

The start of the ARQ transmitter window 480 begins at the start of ARQ2 block 414, which is the first non-'discard' ARQ block. See step 130 of FIG. 1. According to step 140 of FIG. 1, full and partial SDUs in the ARQ transmitter window with zero blocks in the 'not-sent' state are discarded. So for this example, SDU1 410 has no blocks in the 'not-sent' state and ARQ blocks 414, 416 are changed from their former 'waiting-for-retransmission' and 'outstanding' states to 'discard' state ARQ blocks 424, 426. ARQ blocks such as ARQ1 block 422 before the start of the ARQ transmission window are already in a 'discard' state.

SDU2 430 has an associated ARQ6 block 436 in a 'not-sent' state, so step 150 of FIG. 1 sets all of the blocks associated with SDU2 430 to a 'not-sent' state. Thus, 'discard' state ARQ4 block 432 changes to 'not-sent' state ARQ block 442 and 'outstanding' state ARQ5 block 434 changes to 'not-sent' state ARQ block 444.

When the ARQ Reset method is complete, the ARQ transmitter sends 'not-sent' ARQ blocks 442, 444, 446, 456 from row 496 and processes ACKs, NACKs, and timeouts in accordance with the general ARQ process. Although ARQ blocks 414, 416 were not acknowledged, they may have been received by the ARQ receiver. If one or more of these ARQ blocks 414, 416 were not received by the ARQ receiver, the ARQ receiver's high layer should have procedures to handle a missing packet corresponding to SDU1 410.

Although there was an ARQ block 432 in a 'discard' state between two unacknowledged ARQ blocks 416, 434, this 'discard' state ARQ block 432 is set to a 'not-sent' state by the ARQ Reset method of FIG. 1 because it is part of a partially-unsent SDU 430. Then, after the ARQ Reset method has completed, the partially-unsent SDU 430 will be sent in its entirety using ARQ blocks 442, 444, 446. The partial re-sending of SDU 430 will not result in a duplicate packet at the ARQ receiver, because the ARQ receiver is directed to discard all incomplete SDUs during an ARQ Reset procedure.

The ARQ Reset method avoids duplicate packets at the ARQ receiver. This is important because certain higher layer transport protocols cannot handle duplicate packets, or experience low efficiency when dealing with duplicate packets, while most all higher layer transport protocols can handle missing packets. The ARQ Reset method discards SDUs with zero blocks in the 'not-sent' state and changes the state of all ARQ blocks in partially-unsent SDUs to 'not-sent.' When the ARQ Reset method is completed and the ARQ transmitter returns to normal operation, the ARQ transmitter will send ARQ blocks for complete SDUs that had not been previously transmitted in their entirety. For SDUs that had all their ARQ blocks transmitted at least once prior to the ARQ Reset procedure, the ARQ transmitter will not transmit them again after the ARQ Reset procedure even if the blocks were 'outstanding' or 'waiting-for-retransmission' at the time of the ARQ Reset initiation.

While this disclosure includes what are considered presently to be the preferred embodiments and best modes of the invention described in a manner that establishes possession thereof by the inventors and that enables those of ordinary skill in the art to make and use the invention, it will be understood and appreciated that there are many equivalents to the preferred embodiments disclosed herein and that modifications and variations may be made without departing from the scope and spirit of the invention, which are to be limited not by the preferred embodiments but by the appended claims, including any amendments made during the pendency of this application and all equivalents of those claims as issued.

As understood by those in the art, the ARQ Reset method may be implemented using a processor that executes computer program code. Embodiments include computer program code containing instructions embodied in tangible media, such as floppy diskettes, CD-ROMs, hard drives, or any other computer-readable storage medium, wherein, when the computer program code is loaded into and executed by a processor, the processor becomes an apparatus for practicing the invention.

It is further understood that the use of relational terms such as "first" and "second", "top" and "bottom", and the like, if any, are used solely to distinguish one from another entity, item, or action without necessarily requiring or implying any actual such relationship or order between such entities, items or actions. Much of the inventive functionality and many of the inventive principles are best implemented with or in software programs or instructions. It is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation. Therefore, further discussion of such software, if any, will be limited in the interest of brevity and minimization of any risk of obscuring the principles and concepts according to the present invention.

We claim:

1. A method for an Automatic Repeat-reQuest (ARQ) transmitter comprising:
    starting an ARQ Reset procedure;
    disabling transmission of the ARQ transmitter;
    starting an ARQ transmitter window at a first unacknowledged block;
    determining if a first block in the ARQ transmitter window is associated with a service data unit (SDU) having blocks in only a 'discard,' 'outstanding,' or 'waiting-for-retransmission' state; and
    changing the first block to a 'discard' state if the first block in the ARQ transmitter window is associated with an SDU having blocks in only a 'discard,' 'outstanding,' or 'waiting-for-retransmission' state.

2. A method according to claim 1 further comprising:
setting the first block to a 'not-sent' state if the first block in the ARQ transmitter window is associated with an SDU having at least one block in a 'not-sent' state.

3. A method according to claim 1 further comprising:
determining if a second block in the ARQ transmitter window is associated with an SDU having blocks in only a 'discard,' 'outstanding,' or 'waiting-for-retransmission' state; and
changing the second block to a 'discard' state if the second block in the ARQ transmitter window is associated with an SDU having blocks in only a 'discard,' 'outstanding,' or 'waiting-for-retransmission' state.

4. A method according to claim 3 further comprising:
setting the second block to a 'not-sent' state if the second block in the ARQ transmitter window is associated with an SDU having at least one block in a 'not-sent' state.

* * * * *